United States Patent
Chen

(10) Patent No.: US 11,602,782 B2
(45) Date of Patent: Mar. 14, 2023

(54) MESHED SHELL AND SANDBLASTING METHOD

(71) Applicant: Teco Image Systems Co., Ltd., Taipei (TW)

(72) Inventor: Ting-Chun Chen, Taipei (TW)

(73) Assignee: TECO IMAGE SYSTEMS CO., LTD., Taipei (TW)

(*) Notice: Subject to any disclaimer, the term of this patent is extended or adjusted under 35 U.S.C. 154(b) by 330 days.

(21) Appl. No.: 16/922,299

(22) Filed: Jul. 7, 2020

(65) Prior Publication Data

US 2021/0362216 A1 Nov. 25, 2021

(30) Foreign Application Priority Data

May 22, 2020 (TW) ................. 109117252

(51) Int. Cl.
| | | |
|---|---|---|
| *B24C 3/28* | (2006.01) | |
| *B24C 3/12* | (2006.01) | |
| *B24B 31/02* | (2006.01) | |
| *B22C 9/06* | (2006.01) | |
| *B22C 9/12* | (2006.01) | |
| *B22C 9/22* | (2006.01) | |

(Continued)

(52) U.S. Cl.
CPC ............ *B22C 9/06* (2013.01); *B22C 9/12* (2013.01); *B22C 9/22* (2013.01); *B24B 31/02* (2013.01); *B24C 3/086* (2013.01); *B24C 3/12* (2013.01); *B24C 3/28* (2013.01); *B33Y 10/00* (2014.12); *B33Y 30/00* (2014.12); *B33Y 80/00* (2014.12)

(58) Field of Classification Search
CPC .. B24C 3/086; B24C 3/12; B24C 3/26; B24C 3/28; B24B 31/02; B24B 31/0212; B24B 31/03; B24B 31/033; B24B 31/037
USPC ....... 451/32, 34, 35, 38, 80, 82, 83, 85, 326, 451/328
See application file for complete search history.

(56) References Cited

U.S. PATENT DOCUMENTS

| | | | |
|---|---|---|---|
| 2,553,625 A | 5/1951 | Andersen | |
| 2,984,948 A * | 5/1961 | Bixby | ............ B24C 3/26 451/328 |

(Continued)

FOREIGN PATENT DOCUMENTS

| | | |
|---|---|---|
| CN | 1211188 C | 7/2005 |
| CN | 201094482 Y | 8/2008 |

(Continued)

*Primary Examiner* — Eileen P Morgan
(74) *Attorney, Agent, or Firm* — Kirton McConkie; Evan R. Witt

(57) ABSTRACT

A meshed shell and a sandblasting method are provided. The meshed shell includes a first end portion, a second end portion opposite to the first end portion, a first annular portion, a second annular portion connected to the first annular portion, a first mesh portion between the first end portion and the first annular portion and a second mesh portion between the second end portion and the second annular portion. The weights of the first end portion and the second end portion are the same. A maximum inner diameter of the mesh of the first and second mesh portions is smaller than a penetration size of the component. Both of the sum of the weights of the first and second end portions and the sum of the weights of the first and second annular portions are greater than the sum of the weights of the first and second mesh portions.

7 Claims, 5 Drawing Sheets

(51) Int. Cl.
*B24C 3/08* (2006.01)
*B33Y 80/00* (2015.01)
*B33Y 10/00* (2015.01)
*B33Y 30/00* (2015.01)

(56) References Cited

U.S. PATENT DOCUMENTS

| | | | | |
|---|---|---|---|---|
| 3,041,786 | A * | 7/1962 | Schnetzer | B24C 3/26 451/84 |
| 6,367,134 | B1 * | 4/2002 | Sanada | H01G 13/006 451/328 |
| 6,743,082 | B2 * | 6/2004 | Tochishita | C23C 14/028 451/328 |
| 6,861,089 | B2 * | 3/2005 | Nishiuchi | C23C 14/223 427/127 |
| 6,926,594 | B1 * | 8/2005 | Nakayama | B24C 9/00 451/328 |
| 7,238,086 | B1 * | 7/2007 | Maekawa | B24B 31/033 451/36 |
| 2005/0009451 | A1 * | 1/2005 | Tochishita | B24C 3/28 451/38 |
| 2017/0312885 | A1 * | 11/2017 | Rhodes | B24C 1/003 |

FOREIGN PATENT DOCUMENTS

| | | | | |
|---|---|---|---|---|
| CN | 204819189 U | | 12/2015 | |
| CN | 108942691 A | | 12/2018 | |
| EP | 1172177 A1 * | | 1/2002 | B24C 3/26 |
| JP | 2004167609 A | | 6/2004 | |
| TW | M591458 U | | 3/2020 | |
| WO | WO-0208483 A1 * | | 1/2002 | C23C 14/223 |

\* cited by examiner

MESHED SHELL AND SANDBLASTING METHOD

FIELD OF THE INVENTION

The present disclosure relates to a meshed shell and sandblasting method, and more particularly to a meshed shell and sandblasting method that is applied for components of various shapes, weights and sizes.

BACKGROUND OF THE INVENTION

In recent years, the additive manufacturing technology, which is known as 3D printing technology, is widely applied for manufacturing various components. It is because the structural limitations are fewer when manufacturing components through the additive manufacturing technology than through the conventional method. Furthermore, the additive manufacturing technology has the advantage of improving the manufacturing performance. As the additive manufacturing technology advances, the printing rate thereof is greatly improved, and the components can be manufactured in mass production.

In the additive manufacturing technology, the powder-bed fusion is one of the processes with rapidest manufacturing rate. However, after the powder bed fusion, the component manufactured therethrough are usually buried in the powder. The powder is often stuck on the surface of the component and is difficult to be removed. For addressing this problem, the common treatment is blasting sand to the component by a sandblasting machine and making the sand hit the surface of the component. Thereby, the semi-sintered powder stuck on the surface of the component drops down, and the surface of the component is cleaned. To achieve mass production, there is a need to automate the sandblasting process.

The common sandblasting methods include basket type and belt type. Both of them are utilized to blast the high-pressure air containing sand to the surface of the component by making the component roll in the container. However, while the component is forced to roll, it is usually happened that the component with long and narrow shape attaches to the inner surface of the container, which causes the surface of the component hard to be hit by the sand, evenly. Furthermore, it is also frequent that the component with less weight or small size drifts during the sandblasting process, which results in poor surface treatment effect.

Therefore, there is a need of developing a meshed shell and a novel sandblasting method for overcoming the drawbacks of the prior arts, so as to ensure the surface treatment effect of utilizing the sandblasting machine to a batch of the components, and reliably clean the surfaces of the components in the same time.

SUMMARY OF THE INVENTION

It is an object of the present disclosure to provide a meshed shell and sandblasting method to address the above drawbacks encountered by the prior arts.

It is another object of the present disclosure to provide a meshed shell and sandblasting method. By the profile of the meshed shell, the mesh portions and the special weight distribution, the meshed shell can stably roll and allow the sand to enter therein. Thereby, when the components are accommodated in the meshed shell and the sandblasting machine is utilized to perform the surface treatment, the components with long and narrow shape, less weight or small size can naturally roll in the meshed shell, and the surfaces of the components can be uniformly hit by the sand. As the result, the uniformity of the surface treatment is improved. In addition, by disposing a plurality of components in a plurality of meshed shells, the efficacy of performing the surface treatment to a batch of the components is achieved.

In accordance with an aspect of the present disclosure, there is provided a meshed shell. The meshed shell is used to accommodate at least one component and includes a first end portion, a second end portion, a first annular portion, a second annular portion, a first mesh portion and a second mesh portion. The second end portion is opposite to the first end portion and has a weight equal to a weight of the first end portion. The second annular portion is connected to the first annular portion. The first mesh portion is connected between the first end portion and the first annular portion. The second mesh portion is connected between the second end portion and the second annular portion. Both of the first mesh portion and the second mesh portion comprises a plurality of meshes, and a maximum inner diameter of each of the meshes is smaller than a penetration size of the at least one component. The sum of the weights of the first end portion and the second end portion is greater than the sum of the weights of the first mesh portion and second mesh portion. The sum of the weights of the first annular portion and the second annular portion is greater than the sum of the wights of the first mesh portion and second mesh portion.

In accordance with another aspect of the present disclosure, there is provided a sandblasting method. The sandblasting method is used to perform a surface treatment to a plurality of components and includes steps of: (a) disposing a plurality of components in a plurality of meshed shells previously described; (b) disposing the plurality of meshed shells in a container of a sandblasting machine; (c) controlling the sandblasting machine and actuating the container to rotate and make the plurality of meshed shells roll in the container; and (d) controlling a nozzle of the sandblasting machine to blast sand toward the plurality of meshed shells in a specific angle.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
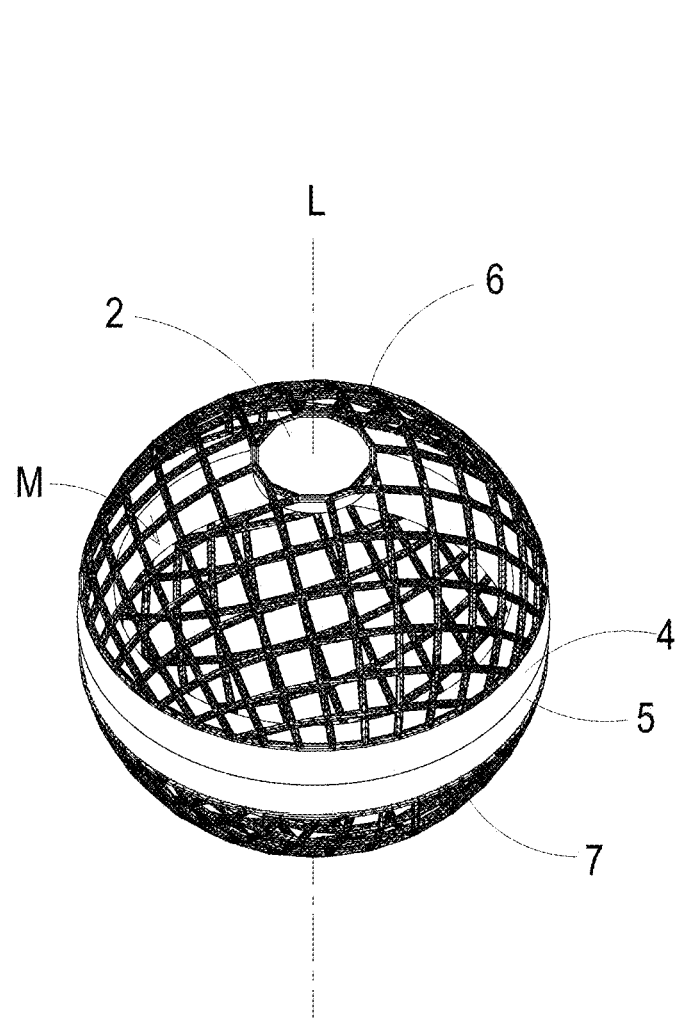
FIG. 1 is a schematic perspective view illustrating the meshed shell according to an embodiment of the present disclosure.
Figure 2:
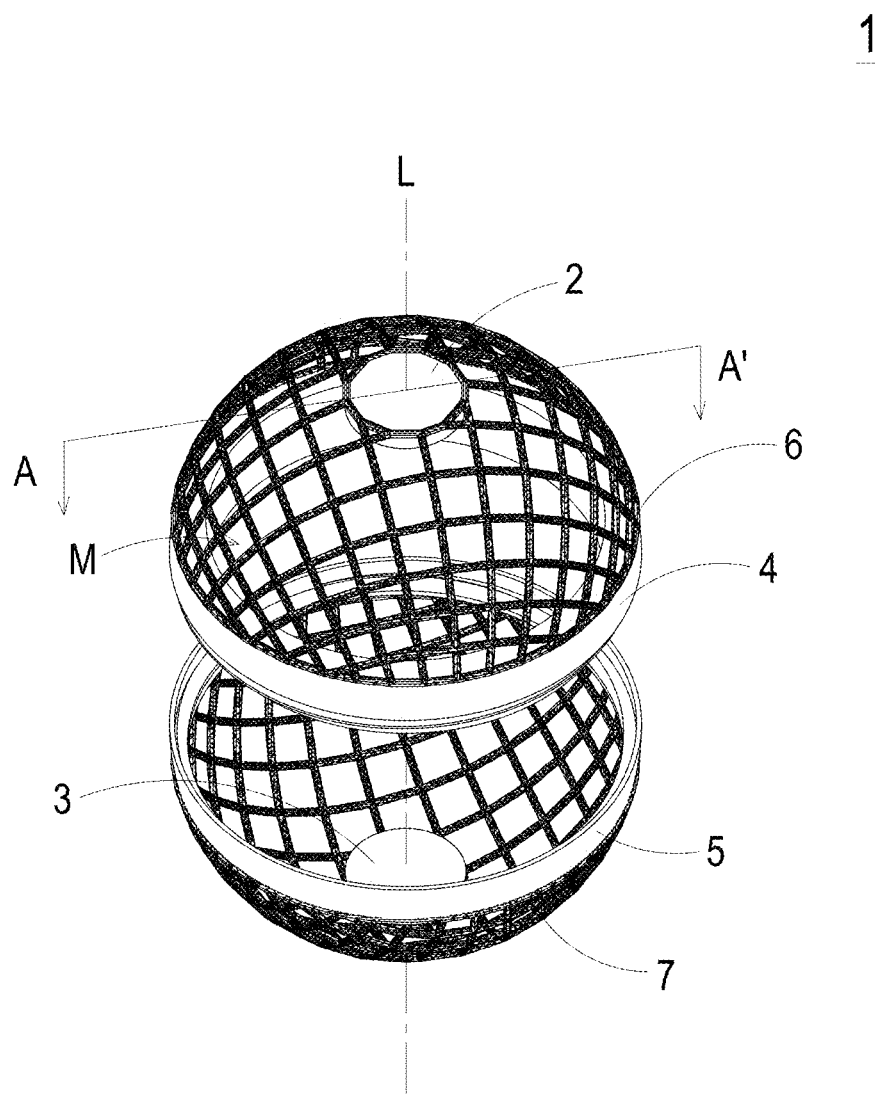
FIG. 2 is a schematic exploded view illustrating the meshed shell of FIG. 1.
Figure 3:
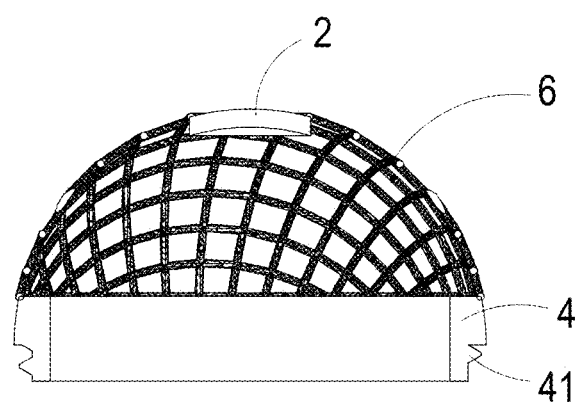
FIG. 3 is a schematic cross-sectional view illustrating the meshed shell and taken from the line A-A' of FIG. 2.
Figure 3:
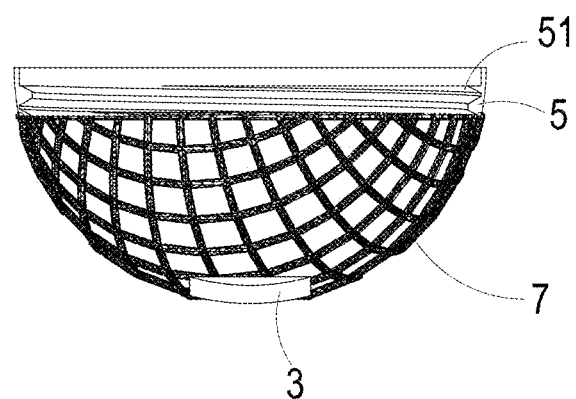

Please refer to FIGS. 1, 2 and 3. FIG. 1 is a schematic perspective view illustrating the meshed shell according to an embodiment of the present disclosure. FIG. 2 is a schematic exploded view illustrating the meshed shell of FIG. 1. FIG. 3 is a schematic cross-sectional view illustrating the meshed shell and taken from the line A-A' of FIG. 2. As shown in figures, the meshed shell is used to accommodate at least one component (not shown) and includes a first end portion 2, a second end portion 3, a first annular portion 4, a second annular portion 5, a first mesh portion 6 and a second mesh portion 7. The first end portion 2 has a weight. The second end portion 3 is opposite to the first end portion 2 and has a weight equal to the weight of the first end portion 2. The second annular portion 5 is connected to the first annular portion 4. The first mesh portion 6 is connected between the first end portion 2 and the first annular portion 4. The second mesh portion 7 is connected between the second end portion 3 and the second annular portion 5. Both of the first mesh portion 6 and the second mesh portion 7 comprises a plurality of meshes M, and a maximum inner diameter of each of the meshes M is smaller than a penetration size of the at least one component. The sum of the weights of the first end portion 2 and the second end portion 3 is greater than the sum of the weights of the first mesh portion 6 and second mesh portion 7. The sum of the weights of the first annular portion 4 and the second annular portion 5 is also greater than the sum of the wights of the first mesh portion 6 and second mesh portion 7.

Please refer to FIG. 1. In this embodiment, the meshed shell 1 has a profile able to roll. In other words, the first end portion 2, the second end portion 3, the first annular portion 4, the second annular portion 5, the first mesh portion 6 and the second mesh portion 7 collaboratively form a hollow sphere, ellipsoid or cylinder, but not limited thereto. In this embodiment, the density or the hardness of the meshed shell 1 is greater than the density or the hardness of the component accommodated in the meshed shell 1. As a result, the meshed shell 1 is prevented from being damaged while rolling and collided with the components, or while the sand is blasted to and hit the meshed shell 1 during the sandblasting process.

In this embodiment, each of the meshes M of the first mesh portion 6 and the second mesh portion 7 can be any shapes, for example, polygon, ellipse or circle. Besides, the shapes and the sizes of the meshes M can be different from each other. The maximum inner diameter of the mesh M represents the maximum distance within the single mesh M. For example, when the mesh M is substantially in square, the maximum inner diameter is equal to the distance between the two opposite corners thereof, i.e., the length of the diagonal thereof. Besides, in this embodiment, the component accommodated in the meshed shell 1 has a length, a width and a height, and the penetration size thereof is defined by the middle size within the length, the width and the height. For ease to describe, the relationship of the three-dimension size of the component is defined that the length is larger than the width, and the width is larger than the height. Under this definition, the penetration size is equal to the width. Each of the maximum inner diameter of the meshes M of the first mesh portion 6 and the second mesh portion 7 is smaller than the width of the component, so that the component is prevented from passing through any of the meshes M and leaving the interior of the meshed shell 1.

Please refer to FIGS. 1 and 2. In this embodiment, the meshed shell 1 has a total weight. The sum of the wights of the first end portion 2 and the second end portion 3 is in a range between 14% and 20% of the total weight. The sum of the weights of the first annular portion 4 and the second annular portion 5 is in a range between 65% and 85% of the total weight. The sum of the wights of the first mesh portion 6 and the second mesh portion 7 is in a range between 1% and 15% of the total weight. In this embodiment, the total weight of the meshed shell 1 is 24 g. The sum of the wights of the first end portion 2 and the second end portion 3 is equal to 16.7% of the total weight, which is approximately 4 g, but not limited thereto. The sum of the weights of the first annular portion 4 and the second annular portion 5 is equal to 70% of the total weight, which is approximately 17 g. The sum of the wights of the first mesh portion 6 and the second mesh portion 7 is equal to 12.5% of the total weight, which is approximately 3 g. By such arrangement of the weight distribution, while the meshed shell 1 is rolling, the gyroscopic torque will act on the first end portion 2 and the second end portion 3, and the centripetal force will act on the first annular portion 4 and the second annular portion 5. Consequently, the meshed shell 1 can stably roll with the line L connecting the first end portion 2 and the second end portion 3 as the axis.

Please refer to FIG. 3. In this embodiment, the meshed shell 1 is composed of the single material. The first end portion 2, the first annular portion 4 and the first mesh portion 6 are integrally formed in one piece, and the second end portion 3, the second annular portion 5 and the second mesh portion 7 are integrally formed in one piece, but not limited thereto. In some embodiments, the first end portion 2, the second end portion 3, the first annular portion 4, the second annular portion 5, the first mesh portion 6 and the second mesh portion 7 are composed of different materials, respectively. In this embodiment, the first end portion 2, the second end portion 3, the first annular portion 4 and the second annular portion 5 are extended toward the interior of the meshed shell 1 so as to have a greater weight, but not limited thereto. In other embodiments, the materials composing the first end portion 2, the second end portion 3, the first annular portion 4 and the second annular portion 5 have higher density, and the materials composing the first mesh portion 6 and the second mesh portion 7 have lower density. Consequently, the weight distribution previously described is achieved.

Please refer to FIG. 1. In this embodiment, the meshed shell 1 is substantially in sphere and has a profile surface area. On the profile of the meshed shell 1, most of the profile surface area thereof is composed of the first mesh portion 6 and the second mesh portion 7, so that the sand can be allowed to pass through the meshes M and enter the interior of the meshed shell 1 as possible in the following sandblasting process. In this embodiment, the sum of the surface areas of the first mesh portion 6 and the second mesh portion 7 on the profile is in a range between 40% and 80% of the profile surface area of the meshed shell 1, but not limited thereto.

Please refer to FIG. 3. In this embodiment, the first annular portion 4 includes a first connection portion 41, and the second annular portion 5 includes a second connection portion 51. The first connection portion 41 and the second connection portion 51 include corresponding structures, respectively, so as to be connected to each other through screwing or fastening and be easily taken apart from each other. In this embodiment, the first connection portion 41 includes external screw thread, and the second connection portion 51 includes internal screw thread, but not limited thereto.

Figure 4:
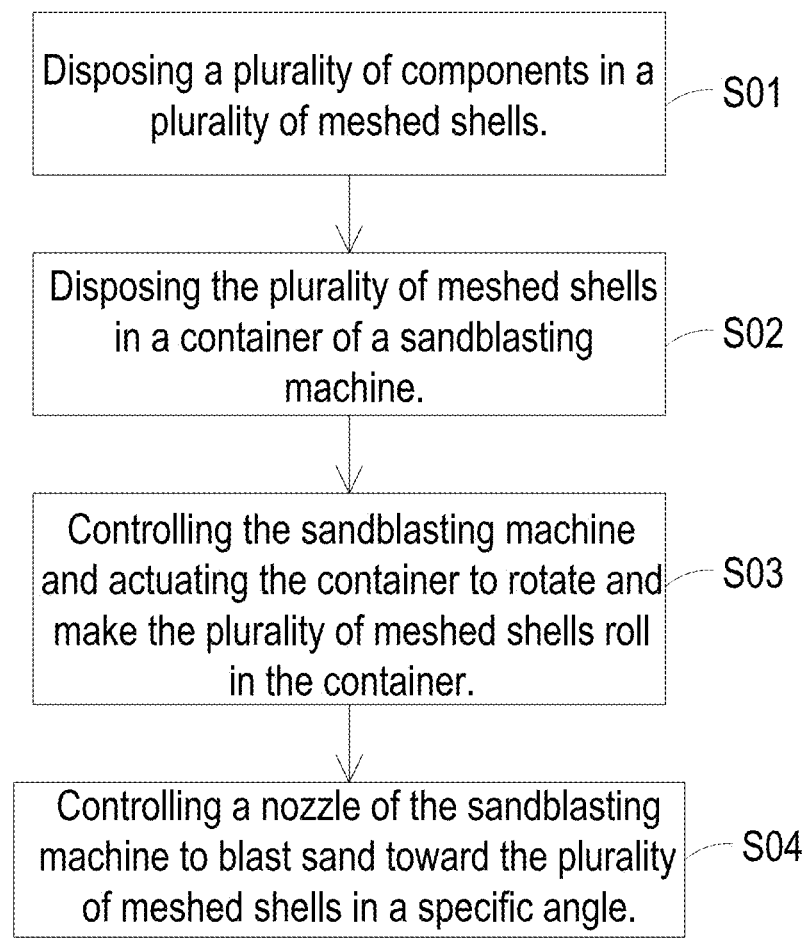
FIG. 4 is a flow chart showing the sandblasting method according to an embodiment of the present disclosure.
Figure 5:
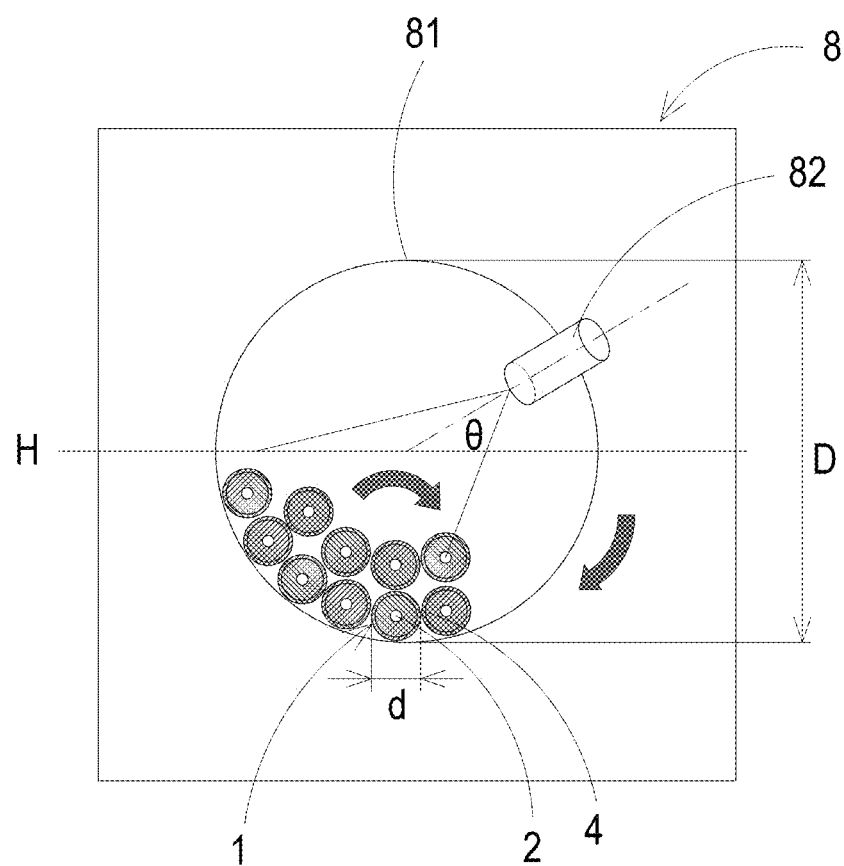
FIG. 5 is a schematic perspective view illustrating the sandblasting machine and the meshed shell described in the sandblasting method of FIG. 4.

Please refer to FIGS. 4 and 5. FIG. 4 is a flow chart showing the sandblasting method according to an embodiment of the present disclosure. FIG. 5 is a schematic perspective view illustrating the sandblasting machine and the meshed shell described in the sandblasting method of FIG. 4. The sandblasting method is used to perform a surface treatment to a plurality of components. As shown in the figures, firstly, at the step S01, the plurality of components are accommodated in a plurality of the meshed shells 1 previously described. Then, at the step S02, the plurality of the meshed shells 1 are accommodated in a container 81 of a sandblasting machine 8. Thereafter, at the step S03, the sandblasting machine 8 is controlled, and the container 81 is actuated to rotate and make the plurality of meshed shells 1 roll in the container 81. Finally, at the step S04, a nozzle 82 of the sandblasting machine 8 is controlled to blast sand toward the plurality of meshed shells 1 in a specific angle θ. By disposing the plurality of components in the meshed shells 1 and making the meshed shells 1 roll by the rotation of the container 81, the components with long and narrow shapes are prevented from attaching to the inner surface of the container 81, and the problem of the components with small sizes, which easily drift when the nozzle 82 blasts sand, is solved. Consequently, all of the components can naturally roll in the meshed shells 1, and the uniformity of the surface treatment is improved.

In this embodiment, at the step S01, each of the meshed shells 1 accommodates at least one component. In other words, single meshed shell 1 can also accommodate a plurality of components. It should be noted that each of the weight of the meshed shells 1 is greater than the sum of the weights of the components accommodated therein, so that the meshed shell 1 can stably roll with the line L as the axis owing to the weight distribution of the first end portion 2, second end portion 3, first annular portion 4 and second annular portion 5.

In this embodiment, the container 81 of the sandblasting machine 8 has a container diameter D and an interior volume. The meshed shell 1 has a shell diameter d. The shell diameter d of the meshed shell 1 is in a range between one sixth and one quarter of the container diameter D of the container 81. In this embodiment, the container diameter D of the container 81 is 400 mm, and the shell diameter d of the meshed shell 1 is 72 mm, but not limited thereto. At the step S02, the sum of the volumes of the meshed shells 1 accommodated in the container 81 is in a range between 20% and 40% of the interior volume of the container 81. At the step S03, a rotation rate of the container 81 is in a range between 4 rpm and 10 rpm, and is preferably but not limited to 6 rpm. Thereby, the plurality of the meshed shells 1 can be stacked with each other and can be stirred as rolling in the container 81. For example, as shown in FIG. 5, when the container 81 rotates in a clockwise direction, the meshed shells 1 accommodated in the container 81 roll in a counterclockwise direction. With the rotation of the container 81, the meshed shells 1 at the lower layer and contacting the container 81 are rolled to the upper layer from the left side of the container 81. Meanwhile, the meshed shells 1 originally at the upper layer fall down to the lower layer from the right side of the container 81. Therefore, by regulating the number of the meshed shells 1 and the rotation rate of the container 81, it can be ensured that each of the meshed shells 1 can be rolled into a sandblasting range of the nozzle 82 during the sandblasting process. As a result, all of the components accommodated in the meshed shells 1 can be hit by the sand. In this embodiment, the number of the layers that the plurality of the meshed shells 1 stacked is in a range between one layer and three layers, preferably two layers, but not limited thereto.

At the step S04, the material composing the sand blasted by the nozzle 82 is the same as the material composing the components, and the blasting pressure of the nozzle 82 is approximately 2 kg/cm$^2$, but not limited thereto. The specific angle θ is defined by the angle between the nozzle 82 of the sandblasting machine 8 and a horizontal line H. In this embodiment, the specific angle θ is continuously varied in a range between 30 degrees and 60 degrees during the sandblasting process, so as to enlarge the sandblasting range and improve the surface treatment effect of the plurality of the components, but not limited thereto. In some embodiments, the specific angle θ is a constant value in a range between 30 degrees and 60 degrees, and is preferably 45 degrees. By the specific angle θ, large surface area of the first mesh portion 6 and the second mesh portion 7 on the meshed shell 1, and stable roll of the meshed shell 1, the sand blasted by the nozzle 82 can pass through the meshes M and enter the interior of the meshed shell 1. Consequently, the surface treatment can be adequately performed to the components naturally rolling in the meshed shell 1.

It should be noted that in this embodiment, since all of the meshed shells 1 are in sphere, there are spaces between the meshed shells 1 and between the meshed shells 1 and the container 81. Therefore, the sand will fall down to the spaces between the meshed shells 1 and between the meshed shells 1 and the container 81 after being blasted to the surfaces of the components. Consequently, the sand will not be remained in the interior of the meshed shells 1 and will not affect the surface treatment effect in the following process.

From the above descriptions, the present disclosure provides a meshed shell and sandblasting method. Owing to the profile of the meshed shell, the mesh portions and the special weight distribution, the meshed shell can stably roll in the container of the sandblasting machine. In addition, the components with various shapes, weight and size can naturally roll in the meshed shell. As a result, the drawbacks of the components with long and narrow shapes easily attaching to the inner surface of the container, and the components with less weights or small sizes easily drifting encountered by the prior art are overcome. Consequently, the uniformity of the surface treatment is improved, and the excellent surface cleaning effect is achieved. In addition, by disposing a plurality of components in a plurality of meshed shells and controlling the specific angle of the nozzle, the efficacy of performing surface treatment to a batch of the components is achieved.

While the disclosure has been described in terms of what is presently considered to be the most practical and preferred embodiments, it is to be understood that the disclosure needs not be limited to the disclosed embodiment.

What is claimed is:

1. A sandblasting method used to perform a surface treatment to a plurality of components and comprising steps of:
   (a) disposing a plurality of components in a plurality of meshed shells, wherein each of the plurality of meshed shells comprises:
   a first end portion;
   a second end portion opposite to the first end portion and having a weight equal to a weight of the first end portion;
   a first annular portion;

a second annular portion connected to the first annular portion;

a first mesh portion connected between the first end portion and the first annular portion; and a second mesh portion connected between the second end portion and the second annular portion;

wherein both of the first mesh portion and the second mesh portion comprise a plurality of meshes, and a maximum inner diameter of each of the plurality of meshes is smaller than a penetration size of the plurality of components, wherein the sum of the weights of the first end portion and the second end portion is greater than the sum of the weights of the first mesh portion and the second mesh portion, and the sum of the weights of the first annular portion and the second annular portion is greater than the sum of the weights of the first mesh portion and the second mesh portion;

(b) disposing the plurality of meshed shells in a container of a sandblasting machine;

(c) controlling the sandblasting machine and actuating the container to rotate and make the plurality of meshed shells roll in the container; and (d) controlling a nozzle of the sandblasting machine to blast sand toward the plurality of meshed shells in a specific angle.

2. The sandblasting method according to claim 1, wherein at the step (a), each of the plurality of the meshed shells accommodates at least one of the components, and each of the weights of the plurality of meshed shells is greater than the sum of the weight of the at least one of the components accommodated in the meshed shell.

3. The sandblasting method according to claim 1, wherein at the step (b), the container has a container diameter, the meshed shell has a shell diameter, and the shell diameter is in a range between one sixth and one quarter of the container diameter.

4. The sandblasting method according to claim 1, wherein at the step (b), the container has an interior volume, and the sum of the volumes of the plurality of meshed shells is in a range between 20% and 40% of the interior volume.

5. The sandblasting method according to claim 1, wherein at the step (c), a rotation rate of the container is in a range between 4 rpm and 10 rpm.

6. The sandblasting method according to claim 1, wherein at the step (d), the specific angle of the nozzle is continuously varied in a range between 30 degrees and 60 degrees.

7. The sandblasting method according to claim 1, wherein at the step (d), the specific angle of the nozzle is a constant value in a range between 30 degrees and 60 degrees.

* * * * *